US012749769B2

(12) United States Patent
Song et al.

(10) Patent No.: US 12,749,769 B2
(45) Date of Patent: Sep. 29, 2026

(54) WATER BASED POLYIMIDE-POWDER COATING COMPOSITION AND METHOD FOR MANUFACTURING COMPOSITE SEPARATOR FOR LITHIUM SECONDARY BATTERY USING SAME

(71) Applicants: XERABRID Co., Ltd., Chungcheongbuk-do (KR); UNIVERSITY INDUSTRY FOUNDATION, YONSEI UNIVERSITY WONJU CAMPUS, Gangwon-do (KR)

(72) Inventors: Seungwon Song, Seoul (KR); Chan Moon Chung, Gangwon-do (KR); Yun Je Choi, Gangwon-do (KR); Hyun Soo An, Gyeonggi-do (KR); Seung Won Jin, Gyeonggi-do (KR); Seung Hyun Lee, Gangwon-do (KR); Jun Seo Lee, Gangwon-do (KR); Dam Bi Kim, Gyeongsangnam-do (KR); Ji Sun Lee, Gyeonggi-do (KR); Hyun Woo Kim, Gangwon-do (KR); Kang Hoon Yoon, Gangwon-do (KR)

(73) Assignees: XERABRID CO., LTD., Chungcheongbuk-do (KR); UNIVERSITY INDUSTRY FOUNDATION, YONSEI UNIVERSITY WONJU CAMPUS, Gangwon-do (KR)

( * ) Notice: Subject to any disclaimer, the term of this patent is extended or adjusted under 35 U.S.C. 154(b) by 955 days.

(21) Appl. No.: 18/045,634

(22) Filed: Oct. 11, 2022

(65) Prior Publication Data

US 2023/0178854 A1 Jun. 8, 2023

(30) Foreign Application Priority Data

Oct. 12, 2021 (KR) ........................ 10-2021-0135309

(51) Int. Cl.
*H01M 50/449* (2021.01)
*C08G 73/10* (2006.01)
(Continued)

(52) U.S. Cl.
CPC ...... *H01M 50/449* (2021.01); *C08G 73/1021* (2013.01); *C08G 73/1032* (2013.01);
(Continued)

(58) Field of Classification Search
None
See application file for complete search history.

(56) References Cited

U.S. PATENT DOCUMENTS

| | | | | |
|---|---|---|---|---|
| 5,248,760 A * | 9/1993 | DuBois | C08G 73/1028 528/229 |
| 8,470,468 B2 | 6/2013 | Xiao et al. | |
| 2020/0028138 A1 * | 1/2020 | Ideta | C08L 77/00 |

FOREIGN PATENT DOCUMENTS

| | | | |
|---|---|---|---|
| KR | 10-1735510 B1 | 5/2017 |
| KR | 10-1984724 B1 | 5/2019 |

(Continued)

OTHER PUBLICATIONS

WO2015190645 Espacenet Translation (Year: 2015).*
(Continued)

*Primary Examiner* — Marc S Zimmer
*Assistant Examiner* — Virginia L Stonehocker
(74) *Attorney, Agent, or Firm* — MH2 Technology Law Group LLP

(57) ABSTRACT

The present invention relates to a method for manufacturing a polyimide-powder composite separator using water and a polyimide-powder composite separator manufactured by the method, and is environmentally friendly since an organic solvent is not used in the overall process of manufacturing the composite separator and has advantageous effects in
(Continued)

terms of time, cost, and manufacturing process since a high temperature/high pressure environment is not required.

17 Claims, 4 Drawing Sheets

(51) Int. Cl.

| | |
|---|---|
| ***C08L 79/08*** | (2006.01) |
| ***C08L 101/10*** | (2006.01) |
| ***C09D 5/24*** | (2006.01) |
| ***C09D 179/08*** | (2006.01) |
| ***C09D 201/10*** | (2006.01) |
| ***H01M 10/052*** | (2010.01) |
| ***H01M 50/40*** | (2021.01) |
| ***H01M 50/403*** | (2021.01) |
| ***H01M 50/414*** | (2021.01) |
| ***H01M 50/417*** | (2021.01) |
| ***H01M 50/429*** | (2021.01) |
| ***H01M 50/489*** | (2021.01) |

(52) U.S. Cl.

CPC .......... *C08G 73/1071* (2013.01); *C08L 79/08* (2013.01); *C08L 101/10* (2013.01); *C09D 5/24* (2013.01); *C09D 179/08* (2013.01); *C09D 201/10* (2013.01); *H01M 10/052* (2013.01); *H01M 50/40* (2021.01); *H01M 50/403* (2021.01); *H01M 50/414* (2021.01); *H01M 50/417* (2021.01); *H01M 50/4295* (2021.01); *H01M 50/489* (2021.01); *Y02E 60/10* (2013.01)

(56) References Cited

FOREIGN PATENT DOCUMENTS

| | | | | |
|---|---|---|---|---|
| WO | WO-2015190645 A1 * | 12/2015 | .............. | C08L 79/08 |
| WO | WO-2020150886 A1 * | 7/2020 | .......... | H01M 50/443 |

OTHER PUBLICATIONS

WO2020150886 Espacenet Translation (Year: 2020).*

Son, Jinyoung, "A study of plasma surface modification on the separator for the lithium ion battery," Korea University Master's Degree Thesis, Dec. 2014, 85 pages.

* cited by examiner

WATER BASED POLYIMIDE-POWDER COATING COMPOSITION AND METHOD FOR MANUFACTURING COMPOSITE SEPARATOR FOR LITHIUM SECONDARY BATTERY USING SAME

CROSS-REFERENCE TO RELATED APPLICATIONS

This application claims priority to Korean Patent Application No. 10-2021-0135309 filed on 12 Oct. 2021, the entire disclosure of which is herein incorporated by reference.

BACKGROUND OF THE INVENTION

Field of the Invention

The present invention relates to a method for manufacturing a water-based polyimide-powder composite separator and a polyimide-powder composite separator manufactured by the method, particularly to a method for manufacturing a composite separator by preparing a polyimide-powder from a dianhydride and a diamine using water as a dispersion medium, then preparing a polyimide-binder solution, and coating a separator with the solution and a composite separator manufactured by the method.

Description of the Related Art

Secondary batteries are the three core components of the information industry along with semiconductors and displays, and are applied to various fields such as small IT devices such as smartphones, artificial intelligence (AI), Internet of Things (IoT), drones, robots, energy storage systems (ESS) and electric vehicles (EVs). Next-generation secondary batteries are one of the major core technologies that will lead the Fourth Industrial Revolution.

A secondary battery includes a positive electrode, a negative electrode, a separator, and an electrolyte. Among these, the separator is located between the positive electrode and the negative electrode to maintain the electrolyte as an insulator and provide a pathway for ionic conduction, and also performs a shutdown function to block the current as a part of the separator melts and the pores are closed when the temperature rises or overcurrent occurs. Separators are a material directly related to the safety of secondary batteries, and plays a key role in thermal safety, for example, when secondary batteries are stored at high temperatures or overcharged, and mechanical safety due to foreign substances such as nail penetration.

Lithium secondary batteries are an electrochemical device insulated by a separator, but have a possibility of heat generation and explosion due to internal short circuits caused by internal or external battery abnormalities or shocks. Therefore, securing the stability of lithium secondary batteries that are closely related to life is the most important consideration. Recently, lithium secondary batteries have been applied to electric vehicles and energy storage systems, and the market requirements for the safety of lithium-ion batteries have also rapidly increased as the energy density increases.

In the case of polyolefin-based porous separators, when the battery is heated to a high temperature by an internal or external stimulus, internal short circuits may occur by shrinkage or melting of the separator, which may result in heat generation and explosion. In addition, the battery may explode by internal short circuits when lithium dendrites generated inside the lithium secondary battery passes through the separator. In order to suppress such a risk of explosion of the battery due to lithium dendrites or thermal shrinkage of the separator caused by high temperatures, a composite separator is disclosed in which one side or both sides of a porous separator substrate are coated with inorganic particles together with a binder so that the inorganic particles have a function of suppressing the shrinkage of the substrate as well as the inorganic coating layer blocks lithium dendrites, and as a result, a safer separator is provided.

In order to improve the cycle efficiency, output, and capacity characteristics of secondary batteries according to the increases in capacity and output required for next-generation secondary batteries, excellent adhesiveness between the electrode and the separator is needed. In addition, it is possible to increase the capacity by diminishing the thickness of the separator and thus filling a more amount of active material in the unit space. However, when the thickness of the separator is diminished, the stability of secondary batteries may be threatened by a decrease in mechanical strength of the separator.

Currently, a technique in which a porous separator substrate formed of a polymer material is coated with a mixture of an inorganic substance and a polymer binder in multiple layers has been disclosed in order to improve the stability of secondary batteries, and a technique in which the surface of the coated separator is coated with a separate adhesive layer has also been attempted in order to improve the adhesiveness between the separator and the electrode. However, such techniques may have problems that the resistance to ion mobility increases in proportion to the complicated coating step and the binder content.

In the case of separators for lithium secondary batteries, in order to improve the heat resistance, chemical resistance, stability, and the like thereof according to the growth of their market, it is attempted to improve their performance through the development of new materials, structural modifications, and the like. As the size of batteries increases, the importance of separators in terms of output and stability is increasing. Accordingly, studies on the coating of separators, the change of the materials for separators, or the like are being conducted. In addition to this, as environmental pollution, cost reduction such as system simplification, and the like are major factors determining market dominance in energy storage devices in recent years, studies are being conducted to solve these.

As a separator, at least high ion permeability, low electrical resistance, ability to support various electrolyte solutions, insulation for positive and negative electrodes, chemical stability to electrolyte solutions, electrochemical stability, affinity for electrode, physical strength, mechanical strength, high processability, possibility to be thinned, and the like are required. In order to satisfy the requirements, the separator is usually composed of a polyolefin-based polymer, and there have been various attempts to improve its properties. In this regard, there were attempts such as grafting of glycidyl methacrylic acid to a polyethylene separator through an electron beam in 2004 and deposition of acrylonitrile on a polyethylene separator using plasma-enhanced chemical vapor deposition (PECVD) equipment in 2009

In this regard, Korean Patent Laid-Open No. 2014-0070199 discloses a porous separator including a porous coating layer containing polymer particles with high hardness, and U.S. Pat. No. 8,470,468 discloses a porous polymer separator coated with a ceramic molecular layer exhibiting electrical resistance. In addition, Korean Patent No. 1,984,724 discloses a lithium-sulfur battery including a polyimide nonwoven fabric.

However, polyimide separators for lithium-ion batteries obtained using polyimide are generally manufactured as nanofiber separators by high-voltage electrostatic spinning and high-temperature imidization treatment, and are not environmentally friendly since organic solvents are used in the manufacturing process. In addition, the polyimide separators have problems of time and cost for commercial use since high voltage and high pressure are used in the manufacturing process. Accordingly, the present inventors have revealed that a polyimide separator for a lithium secondary battery can be manufactured using a water-based polyimide-powder, and completed the present invention by newly confirming a method capable of manufacturing a polyimide separator in an environmentally friendly and economical manner compared to the conventional methods.

CITATION LIST

Patent Literature

Patent Literature 1: Korea Patent Laid-Open No. 2014-0070199

Patent Literature 2: U.S. Pat. No. 8,470,468

Patent Literature 3 Korean Patent No. 1,984,724

[Non-Patent Literatures

Non-Patent Literature 1: Study on Surface Modification of Separator for Lithium-Ion Battery Using Plasma, SON JinYeong, Master's Thesis, Korea University, 2013

SUMMARY OF THE INVENTION

The present invention is intended to solve the problems of time and cost due to the use of high voltage and high temperature by the conventional polyimide separators manufactured using organic solvents and the problem of not being environmentally friendly caused by the separate treatment cost consumed depending on the by-products of organic solvents.

In order to achieve the object, the present invention provides a method for manufacturing a composite separator, the method comprising:

(a) preparing a polyimide-powder by reacting a dianhydride with a diamine in water;

(b) preparing a polyimide-binder solution by mixing the polyimide-powder prepared in step (a) with a binder;

(c) preparing a composite separator by coating a separator with the polyimide-binder solution prepared in step (b).

In an aspect of the present invention, the dianhydride in step (a) may be represented by the following Chemical Formula 1.

[Chem. 1]

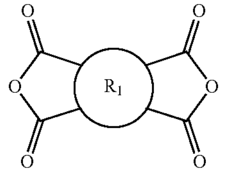

In an aspect of the present invention, the diamine in step (a) may be represented by the following Chemical Formula 2.

[Chem. 2]

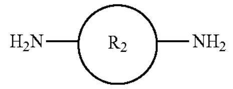

$R_1$ and $R_2$ will be described later.

In an aspect of the present invention, a compound represented by the following Chemical Formula 3 is further added in step (a):

$NH_2—R_3—Si(R_4)_3$ [Chem. 3]

where $R_3$ is substituted or unsubstituted $C_{1-10}$ alkylene or substituted or unsubstituted $C_{1-10}$ heteroalkylene, where one or more hydrogen atoms are substituted with =O, —OH, $C_{1-3}$ alkyl or $NH_2$ when substituted, and each $R_4$ is independently $C_{1-3}$ alkoxy.

In an aspect of the present invention, a catalyst and a dehydrating agent are further added in step (a).

In an aspect of the present invention, the reaction in step (a) is conducted at 10° C. to 100° C. In a specific aspect of the present invention, the reaction in step (a) is conducted at 15° C. to 80° C.

In an aspect of the present invention, the reaction in step (a) may be conducted for 15 to 35 hours. In a specific aspect of the present invention, the reaction in step (a) may be conducted for 20 to 30 hours.

In a specific aspect of the present invention, the catalyst is one or more selected from the group consisting of pyridine, imidazole, quinoline, isoquinoline, trimethylamine, triethylamine, tripropylamine, tributylamine, dimethylpyridine, and methylethylpyridine.

In a specific aspect of the present invention, the dehydrating agent is one or more selected from the group consisting of acetic anhydride, propionic anhydride, butyric anhydride, formic anhydride, and aromatic monocarboxylic anhydride.

In an aspect of the present invention, a polyimide-binder solution is prepared using water as a solvent in step (b).

In an aspect of the present invention, the polyimide-powder is 1 to 10 wt % with respect to the polyimide-binder solution in step (b). In a specific aspect of the present invention, the polyimide-powder is 3 to 6 wt % with respect to the polyimide-binder solution in step (b).

In an aspect of the present invention, a binder is 0.01 to 0.5 wt % with respect to the polyimide-binder solution in step (b). In a specific aspect of the present invention, a binder is 0.05 to 0.2 wt % with respect to the polyimide-binder solution in step (b).

In an aspect of the present invention, the binder in step (b) is one or more selected from the group consisting of carboxymethyl cellulose, cellulose, hydroxypropyl cellulose, hydroxypropyl methylcellulose, hydroxyethyl methyl cellulose, polyvinyl alcohol, polyacrylamide, polyacrylic acid, polyvinyl pyrrolidone, pullulan, polyethylene glycol, divinyl ether-maleic anhydride (DIVEMA), polyoxazoline, polyphosphate, and polyphosphazene. In a specific aspect of the present invention, the binder is carboxymethyl cellulose.

In an aspect of the present invention, the separator in step (c) is formed of polyethylene, polypropylene, or a combination thereof.

In an aspect of the present invention, the composite separator is a separator for a lithium-ion secondary battery.

The present invention also provides a composite separator manufactured by the manufacturing method described above.

In an aspect of the present invention, the composite separator has a contact angle of 35° or less.

In an aspect of the present invention, the composite separator has a thermal shrinkage of 10% or less.

DETAILED DESCRIPTION OF THE PREFERRED EMBODIMENTS

Figure 1:
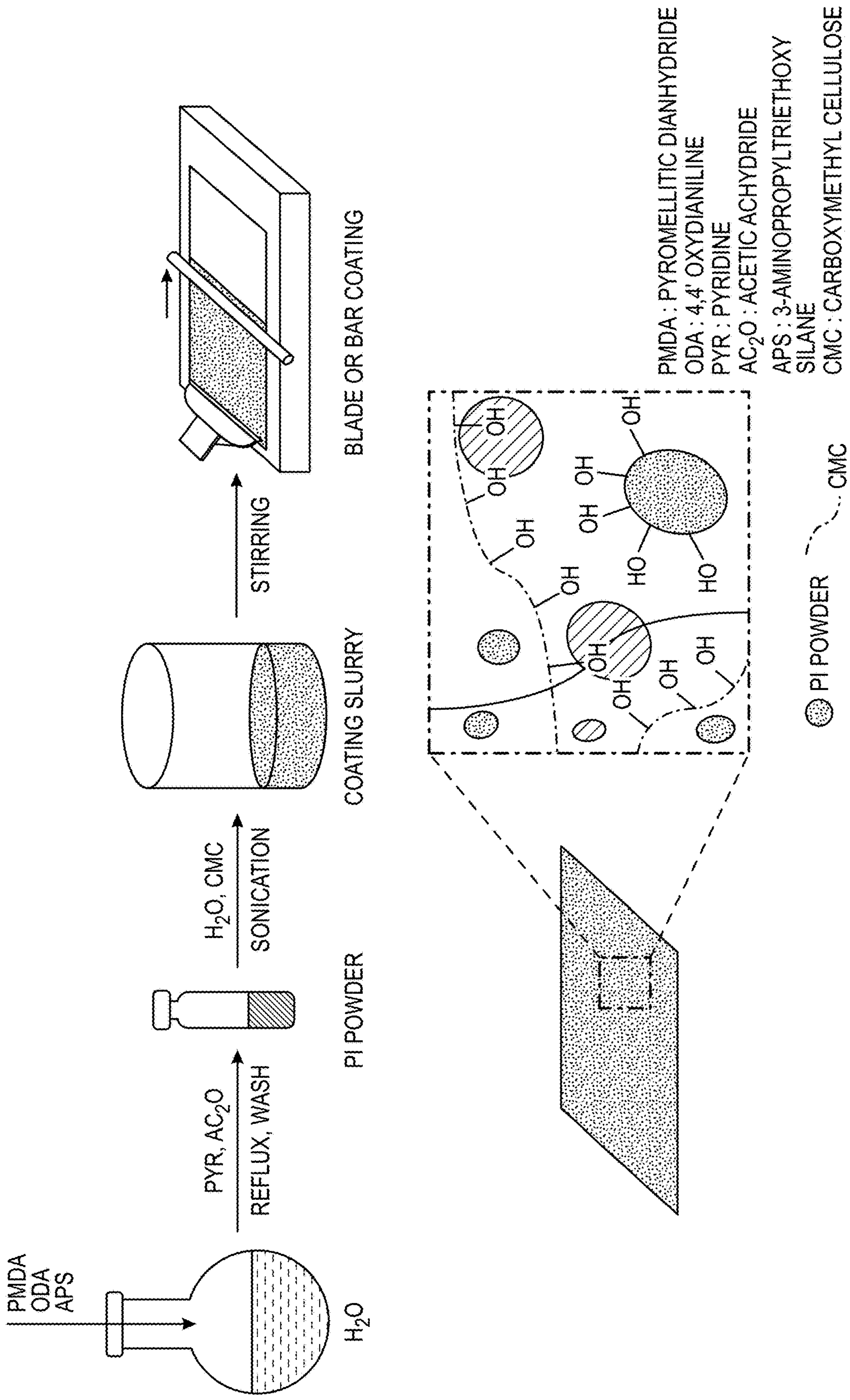
FIG. 1 is a view illustrating the method for manufacturing a composite separator according to the present invention.

Hereinafter, the present invention will be described in detail.

The present invention relates to a method for manufacturing a composite separator, the method comprising: (a) preparing a polyimide-powder by reacting a dianhydride with a diamine in water;

(b) preparing a polyimide-binder solution by mixing the polyimide-powder prepared in step (a) with a binder;

(c) preparing a composite separator by coating a separator with the polyimide-binder solution prepared in step (b).

The present invention also provides a composite separator manufactured by the manufacturing method described above.

In the present specification, a 'dianhydride' may react with a diamine to form a polyamic acid (polyimide precursor), the polyamic acid may then form a polyimide, and a dianhydride is not limited to the dianhydride itself but includes precursors or derivatives thereof.

In the present specification, a 'diamine' may react with a dianhydride to form a polyamic acid (polyimide precursor), the polyamic acid may then form a polyimide, and a diamine is not limited to the diamine itself but includes precursors or derivatives thereof.

In an aspect of the present invention, the dianhydride in step (a) may be represented by the following Chemical Formula 1.

[Chem. 1]

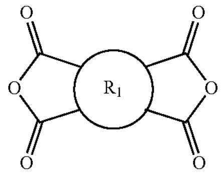

$R_1$ in Chemical Formula 1 is selected from the group consisting of the following chemical structures:

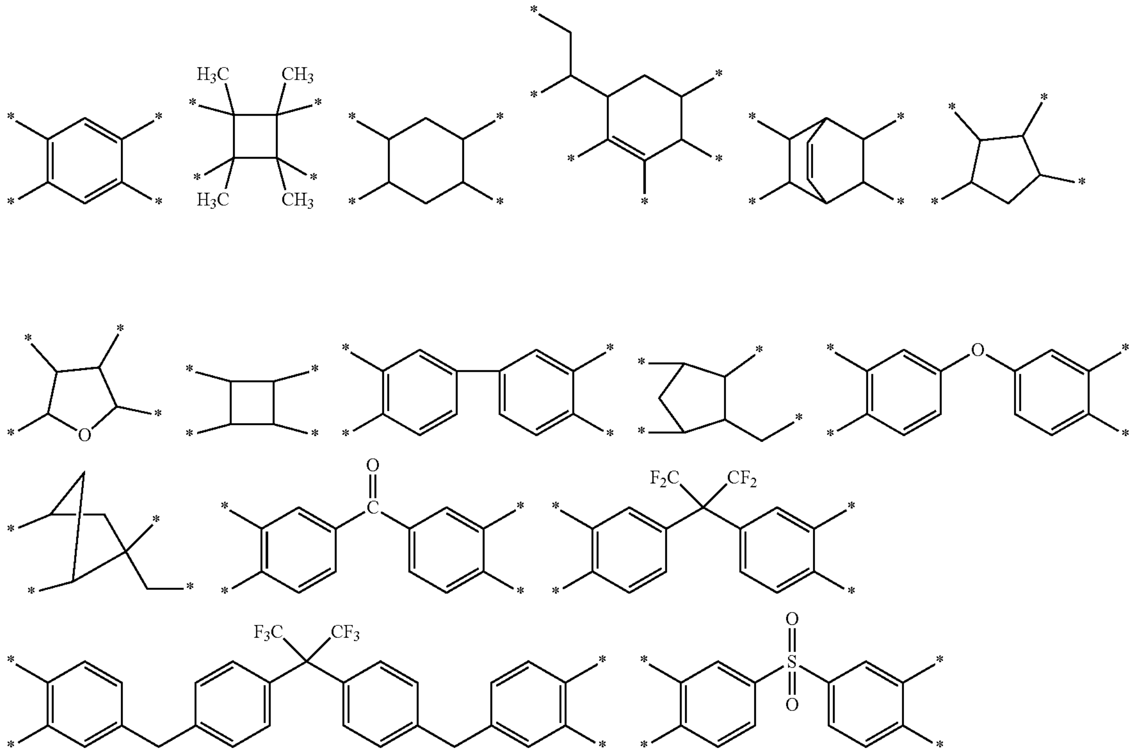

-continued
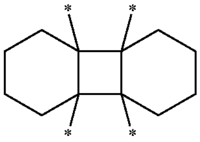
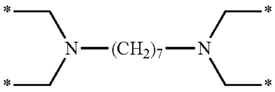
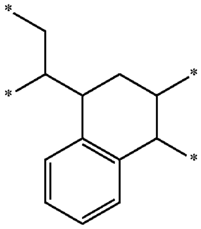
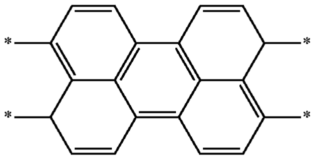
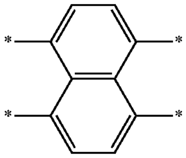
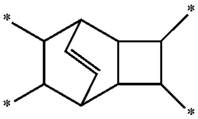
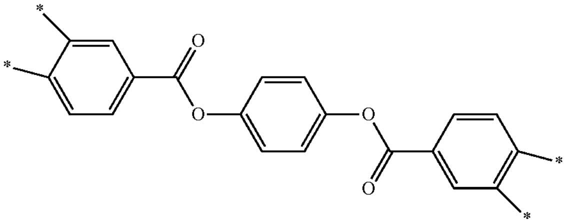
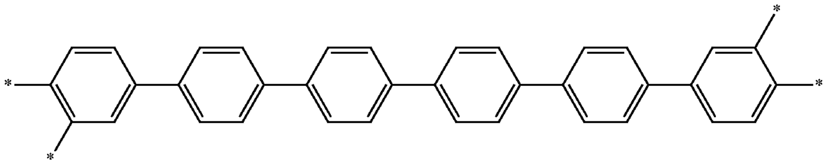
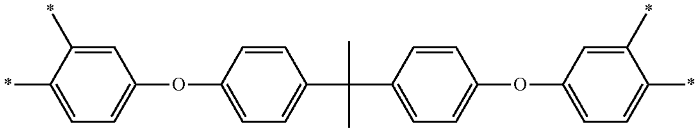
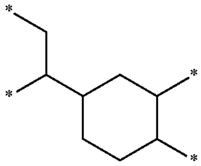
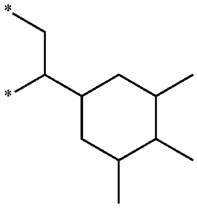
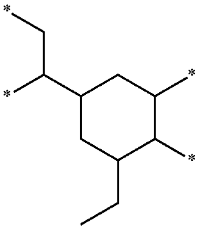
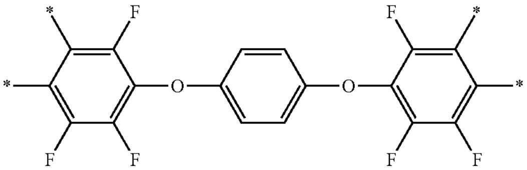
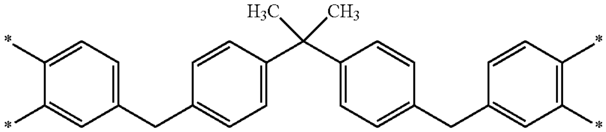
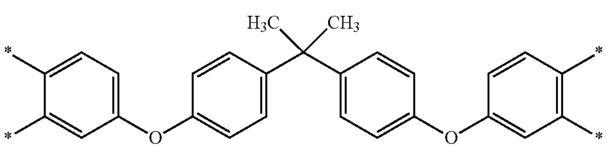
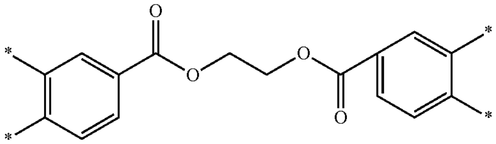
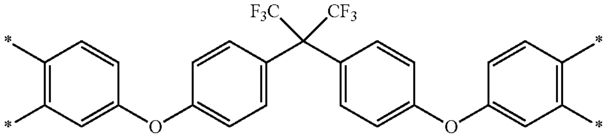
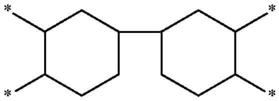
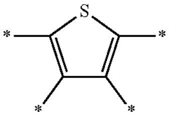
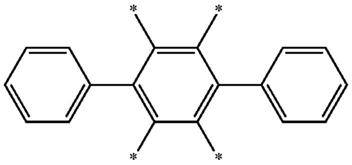
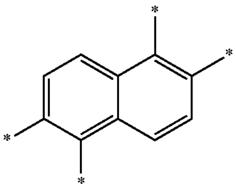
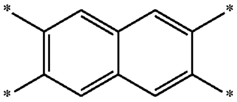
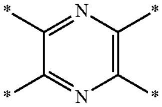

-continued
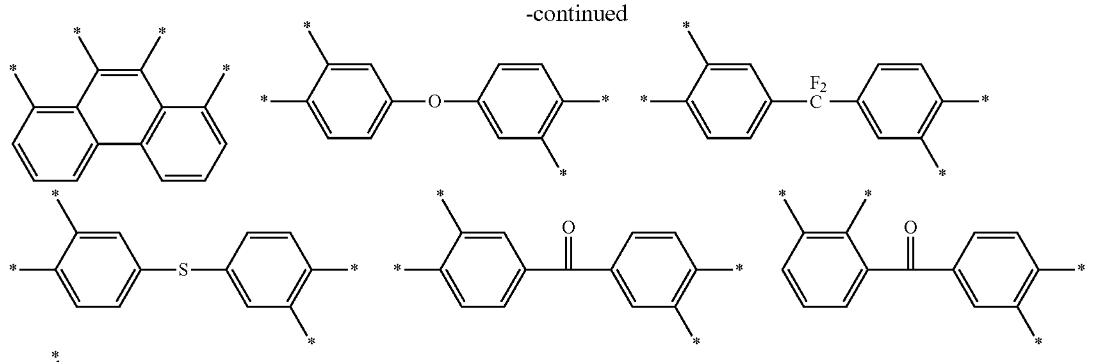
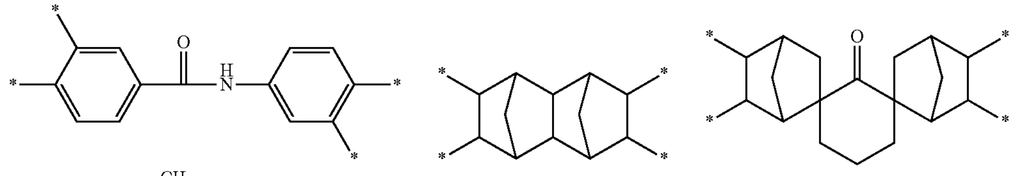
and
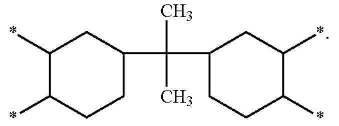
In an aspect of the present invention, the diamine in step (a) may be represented by the following Chemical Formula 2.
[Chem. 2]
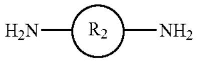
$R_2$ in Chemical Formula 2 is selected from the group consisting of the following chemical structures:
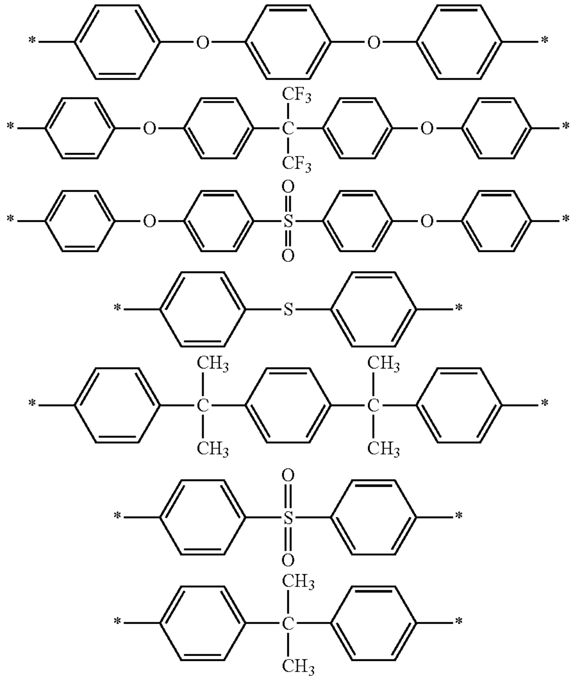
-continued
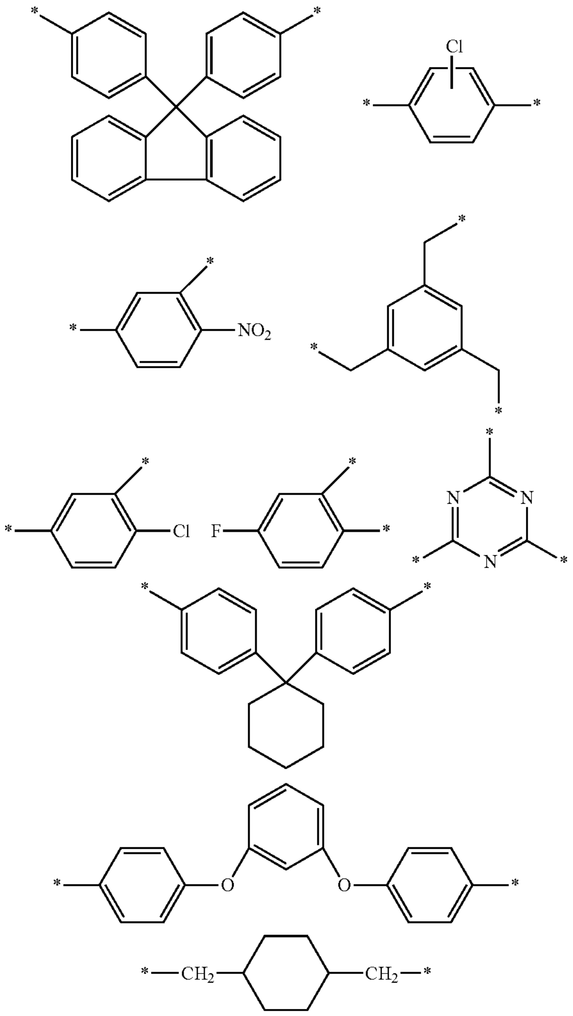

-continued
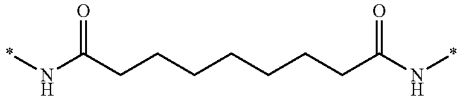
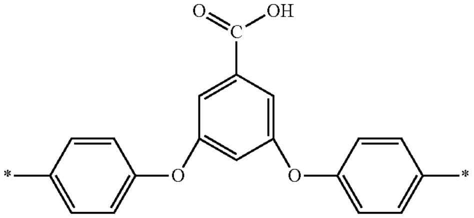
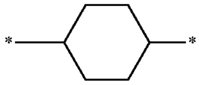
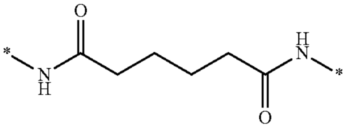
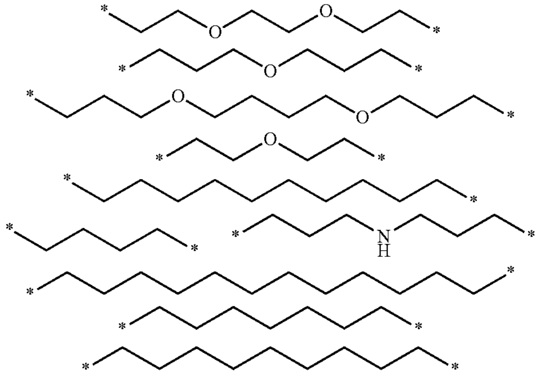
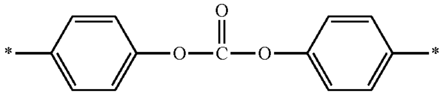
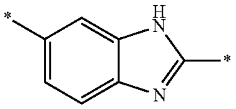
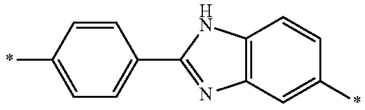
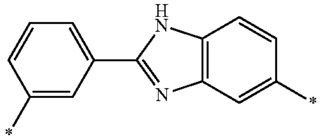
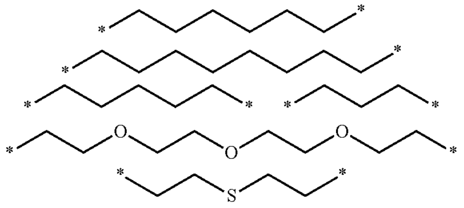
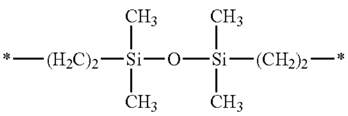
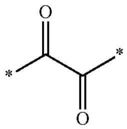
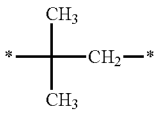
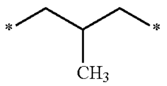
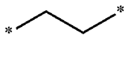
-continued
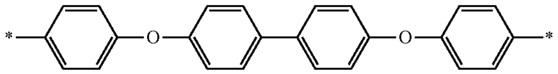
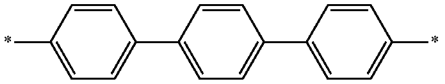
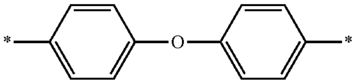
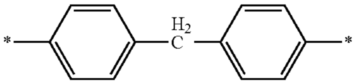
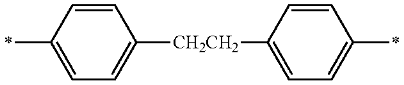
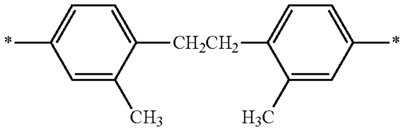
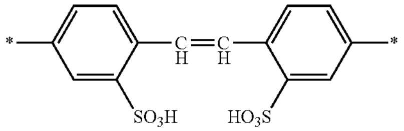
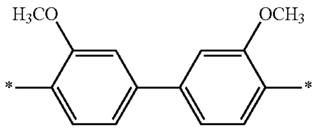
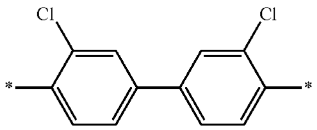
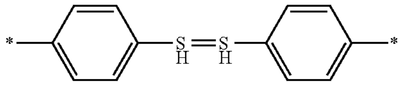
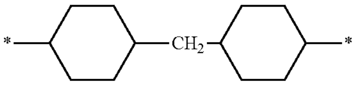
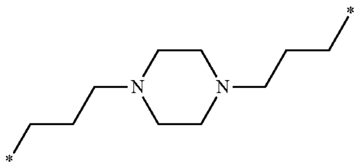
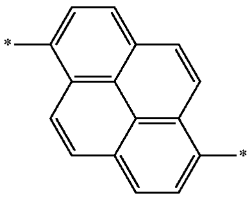
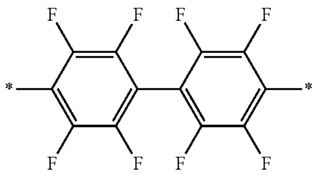
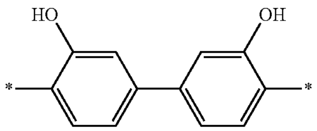
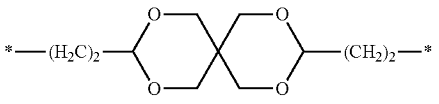

-continued
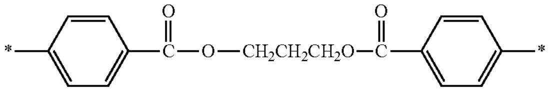
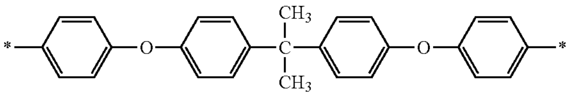
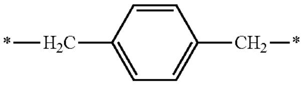
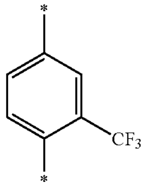
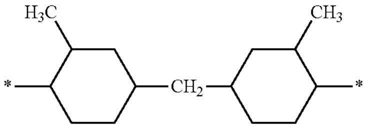
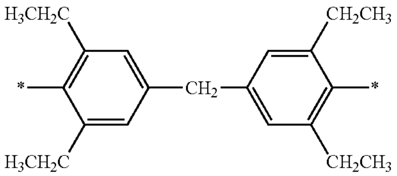
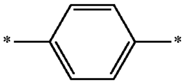
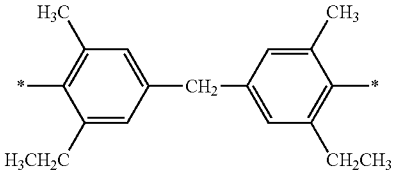
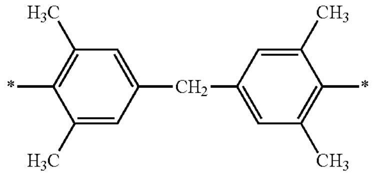
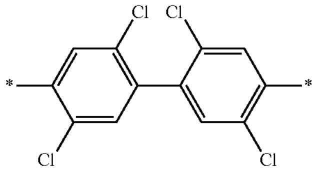
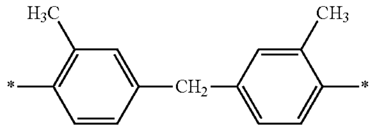
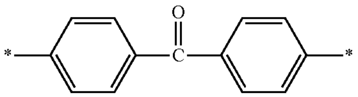
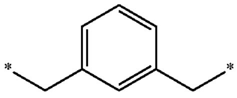
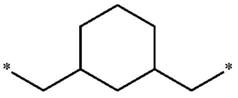
-continued
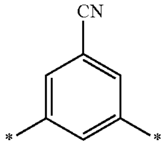
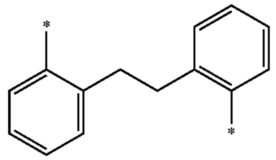
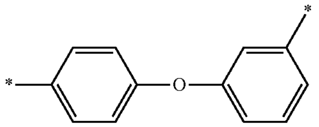
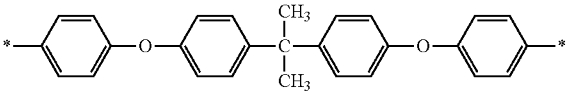
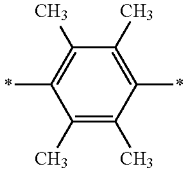
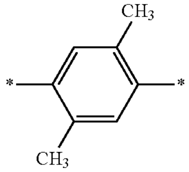
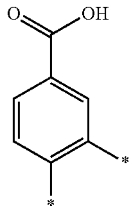
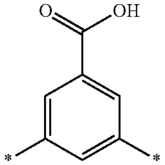
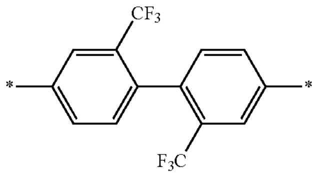
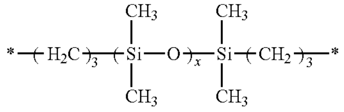
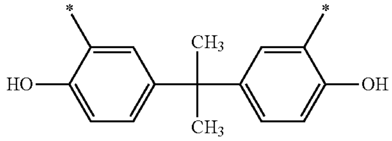
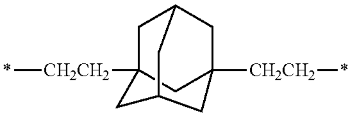
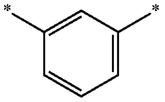
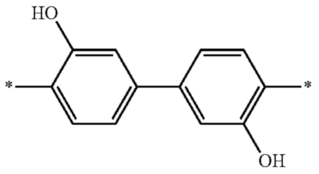
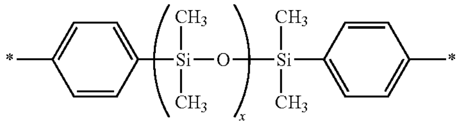
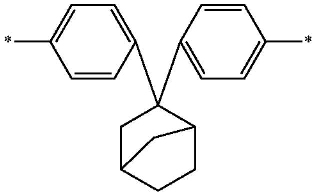

-continued
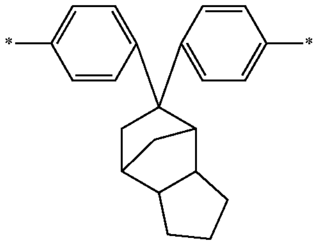
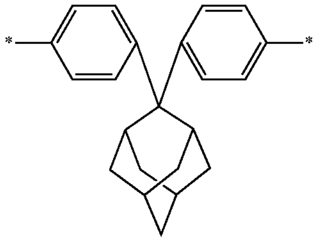
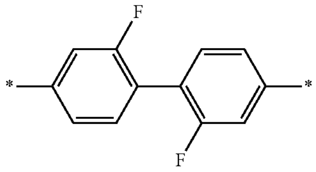
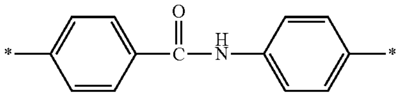
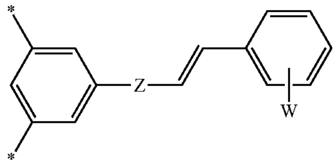
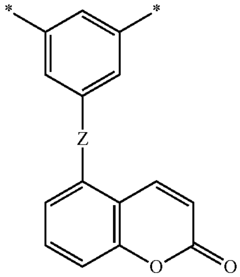
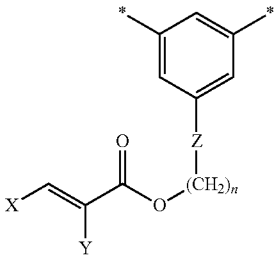
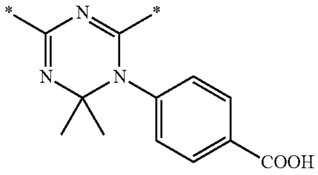
-continued
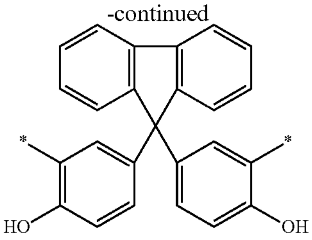
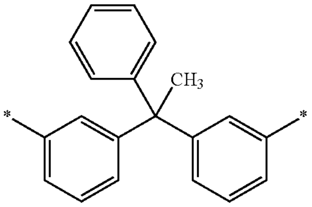
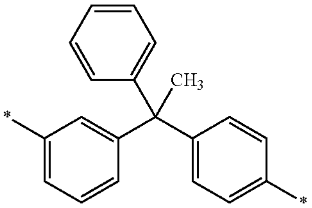
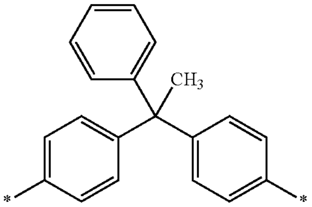
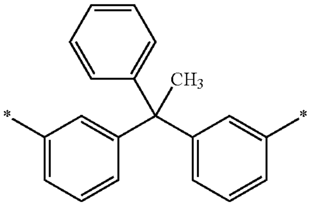
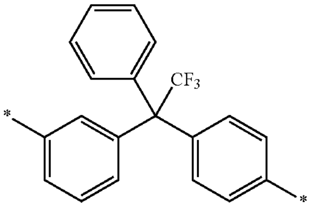
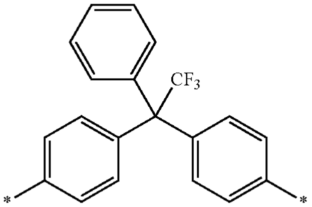
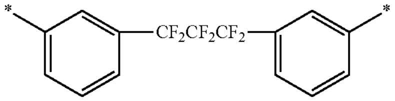
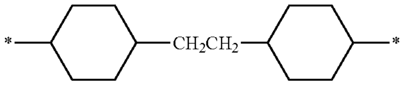
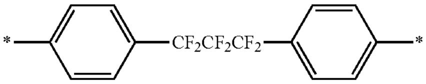

-continued

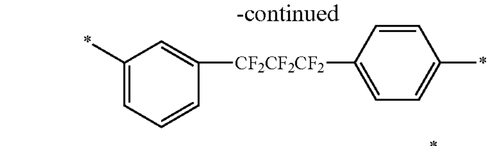

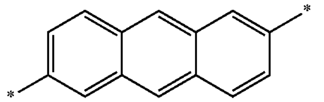

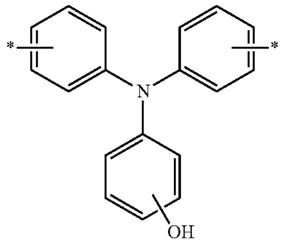

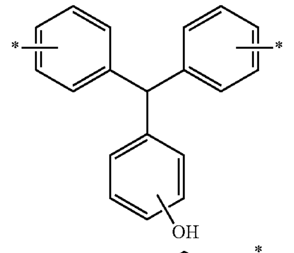

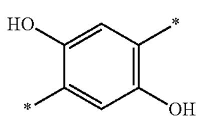

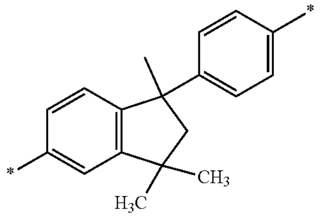

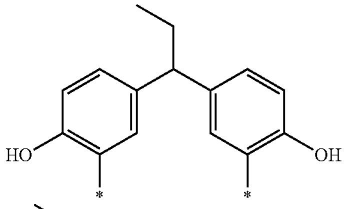

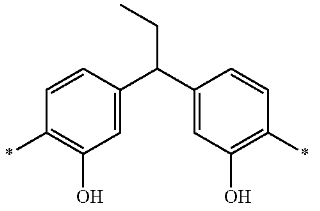

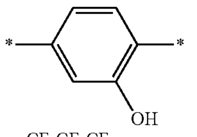

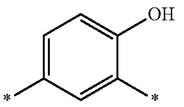

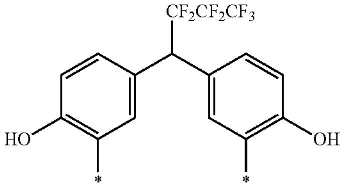

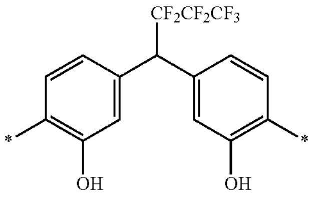

and

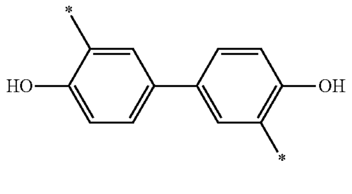

where x is an integer satisfying 1≤x≤50, n is a natural number in a range of 1 to 20, W, X, and Y are each an alkyl group having 1 to 30 carbon atoms or an aryl group, and Z is selected from the group consisting of an ester group, an amide group, an imide group and an ether group.

In an aspect of the present invention, a compound represented by the following Chemical Formula 3 is further added in step (a):

$NH_2—R_3—Si(R_4)_3$ [Chem. 3]

where $R_3$ is substituted or unsubstituted $C_{1-10}$ alkylene or substituted or unsubstituted $C_{1-10}$ heteroalkylene, where one or more hydrogen atoms are substituted with =O, —OH, $C_{1-3}$ alkyl or $NH_2$ when substituted, and each $R_4$ is independently $C_{1-3}$ alkoxy.

In a specific aspect of the present invention, in Chemical Formula 3, $R_3$ is unsubstituted $C_{1-10}$ alkylene or unsubstituted $C_{1-10}$ heteroalkylene and each $R_4$ is independently $C_{1-3}$ alkoxy.

In a specific aspect of the present invention, in Chemical Formula 3, $R_4$ is ethoxy or methoxy.

In an aspect of the present invention, the compound represented by Chemical Formula 3 is further added in step (a), and the equivalent ratio of the diamine to the compound represented by Chemical Formula 3 is 1:0.01 to 0.1. The equivalent ratio is more specifically 1:0.01 to 0.5, still more specifically 1:0.015 to 0.03.

In the present invention, the compound represented by Chemical Formula 3 may be further added after a dianhydride and a diamine are mixed together, and has an amine functional group and thus may react with the dianhydride to change the properties of polyimide-powder.

In an aspect of the present invention, the reaction may be conducted by further adding a catalyst and a dehydrating agent in step (a).

In a specific aspect of the present invention, the catalyst may be one or more selected from the group consisting of pyridine, imidazole, quinoline, isoquinoline, trimethylamine, triethylamine, tripropylamine, tributylamine, dimethylpyridine, and methylethylpyridine.

In a specific aspect of the present invention, the dehydrating agent may be one or more selected from the group consisting of acetic anhydride, propionic anhydride, butyric anhydride, formic anhydride and aromatic monocarboxylic anhydride.

In an aspect of the present invention, the reaction in step (a) is conducted at 10° C. to 100° C.

In a specific aspect of the present invention, the reaction in step (a) may be conducted at 15° C. to 80° C., more specifically at 15° C. to 70° C. or 15° C. to 65° C.

In an aspect of the present invention, the reaction in step (a) is conducted for 15 to 35 hours.

In a specific aspect of the present invention, the reaction in step (a) may be conducted for 20 to 30 hours, more specifically for 21.5 to 28.5 hours or 23 to 27 hours.

Step (a) may be more specifically carried out by reacting a dianhydride with a diamine at 40° C. to 80° C., then adding a catalyst and a dehydrating agent, and further conducting the reaction at 15° C. to 30° C. Step (a) may be more specifically carried out by reacting a dianhydride with a diamine at 40° C. to 80° C. for 21 to 25 hours, then adding a catalyst and a dehydrating agent, and conducting the reaction at 15° C. to 30° C. for 2 to 4 hours. At this time, the polyimide-powder can be directly prepared through step (a) without performing an additional treatment.

In an aspect of the present invention, a polyimide-binder solution is prepared using water as a solvent in step (b). In the present invention, a composite separator can be manufactured using water as a solvent in each step, and thus the time required for manufacture is diminished.

In the present invention, the physical properties of the composite separator are improved although an organic solvent is not used in steps (a) and (b) and a high temperature and a high pressure are not applied.

In an aspect of the present invention, the polyimide-powder is 1 to 10 wt % with respect to the polyimide-binder solution in step (b).

In a specific aspect of the present invention, the polyimide-powder is 3 to 6 wt %, more specifically 4 to 5.5 wt % or 4.5 to 5.5 wt % with respect to the polyimide-binder solution in step (b).

In an aspect of the present invention, a binder is 0.01 to 0.5 wt % with respect to the polyimide-binder solution in step (b).

In a specific aspect of the present invention, the binder in step (b) is 0.01 to 0.3 wt %, more specifically, 0.05 to 0.25 wt % or 0.05 to 0.2 wt % with respect to the polyimide-binder solution.

In an aspect of the present invention, the binder in step (b) is one or more selected from the group consisting of carboxymethyl cellulose, cellulose, hydroxypropyl cellulose, hydroxypropyl methylcellulose, hydroxyethyl methyl cellulose, polyvinyl alcohol, polyacrylamide, polyacrylic acid, polyvinyl pyrrolidone, pullulan, polyethylene glycol, divinyl ether-maleic anhydride (DIVEMA), polyoxazoline, polyphosphate, and polyphosphazene.

In a specific aspect of the present invention, a binder in step (b) is polyvinyl alcohol.

In a specific aspect of the present invention, the binder in step (b) is carboxymethyl cellulose or a salt thereof.

The binder, together with the polyimide-powder, is eco-friendly since an organic solvent is not used throughout the manufacturing process.

In an aspect of the present invention, the separator in step (c) is formed of polyethylene, polypropylene, or a combination thereof. Here, in the case of a combination of separators, the separator may mean a multilayer membrane composed of polyethylene/polypropylene, polyethylene/polypropylene/polyethylene, or the like.

In the present invention, the coating method in step (c) is not particularly limited, and a coating method known in the art, for example, bar coating, roll coating, die coating, spray coating, and the like may be used. In an aspect of the present invention, coating in step (c) may be performed by bar coating.

In an aspect of the present invention, the composite separator is a separator for a lithium-ion secondary battery.

The present invention also relates to a composite separator manufactured by the manufacturing method described above.

The present invention also relates to a lithium-ion battery comprising a positive electrode, a negative electrode, and a composite separator manufactured by the manufacturing method described above.

In the present invention, the composite separator may have a thickness of 0.1 to 100 μm, more specifically 5 to 50 μm. The positive electrode and the negative electrode are not particularly limited, and electrodes known in the art, for example, lithium cobalt oxide, lithium nickel oxide, lithium iron oxide, and the like may be used as the positive electrode and carbon, lithium metal, lithium alloy, graphite, and the like may be used as the negative electrode.

In an aspect of the present invention, the composite separator has a contact angle of 35° or less. The contact angle is a value measured by bringing water into contact with the surface of the composite separator. In a specific aspect of the present invention, the contact angle may be 32° or less, more specifically 30° or less.

In an aspect of the present invention, the composite separator has a thermal shrinkage of 10% or less. In a specific aspect of the present invention, the thermal shrinkage may be 7% or less, 5% or less, or 3% or less.

The composite separator of the present invention has a low contact angle, a low thermal shrinkage, and an improved electrolyte absorption, and thus has excellent properties so as to be used as a separator for lithium-ion secondary batteries. Specifically, the life of the secondary battery separator is increased, the safety is excellent as internal short circuits do not occur because of excellent heat resistance, and high output characteristics may be exhibited by high ionic conductivity.

Hereinafter, the present invention will be described in detail by way of Examples and Experimental Examples.

However, the following Examples and Experimental Examples are merely illustrative of the present invention, and the contents of the present invention are not limited to the following Examples and Experimental Examples.

<Example 1> Manufacture of Polyimide-Powder Composite Separator for Lithium-Ion Battery

<Example 1-1> Synthesis of Polyimide-Powder

Into a 500 mL two-necked round-bottom flask purged with nitrogen gas, 250 mL of distilled water was put, 10.9 g (50 mmol) of pyromellitic dianhydride (PMDA) was added and dissolved at 60° C., then 9.8 g (49 mmol) of 4,4'-oxydianiline (ODA) was added, and the reaction was conducted at room temperature for 3 hours. To the reaction product, 0.2 g (1 mmol) of 3-aminopropyltriethoxy silane (APS) was added, the reaction was conducted for 1 hour, then 7.91 g (100 mmol) of pyridine and 10.2 g (100 mmol) of acetic anhydride were added, the reaction was conducted for 3 hours, and filtration under reduced pressure was performed to prepare a polyimide-powder.

<Example 1-2> Preparation of Polyimide-Binder Coating Solution

The polyimide-powder prepared in <Example 1-1> was dried and then dispersed in 100 mL of distilled water at 5 wt %, and carboxymethyl cellulose as a binder material was added at 0.1 wt % to prepare a polyimide-binder coating solution.

Figure 6:
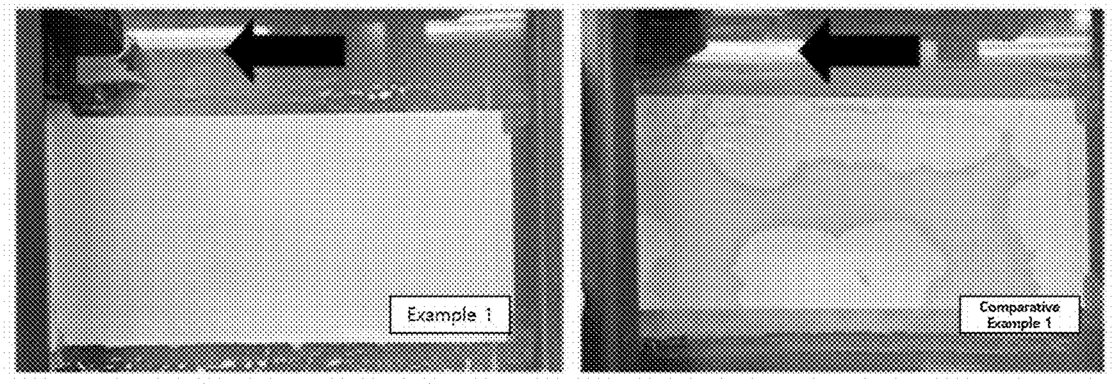
FIG. 6 is a view illustrating a result of comparing the coating uniformity of Example of the present invention with that of Comparative Example.

<Example 1-3> Manufacture of Polyimide-Powder Composite Separator for Lithium-Ion Battery A polyethylene separator for lithium-ion batteries was coated with 10 mL of the polyimide-binder coating solution prepared in <Example 1-2> by bar coating, and dried at 40° C. for 30 minutes to manufacture a polyimide-powder composite separator for lithium-ion batteries. As a result, it has been confirmed that a uniform coating is formed, as illustrated in FIG. 6.

<Comparative Example 1> Manufacture of Polyimide-Powder Composite Separator

A separator was coated with a polyimide-powder in the same manner as in Example 1-3 except that the coating solution was prepared using the polyimide-powder P84 manufactured by E company to manufacture a coated composite separator. As a result, a uniform coating is not formed, as illustrated in FIG. 6.

<Experimental Example 1> Analysis of Polyimide-Powder Composite Separator for Lithium-Ion Battery

<Experimental Example 1-1> Analysis of Contact Angle

Figure 2:
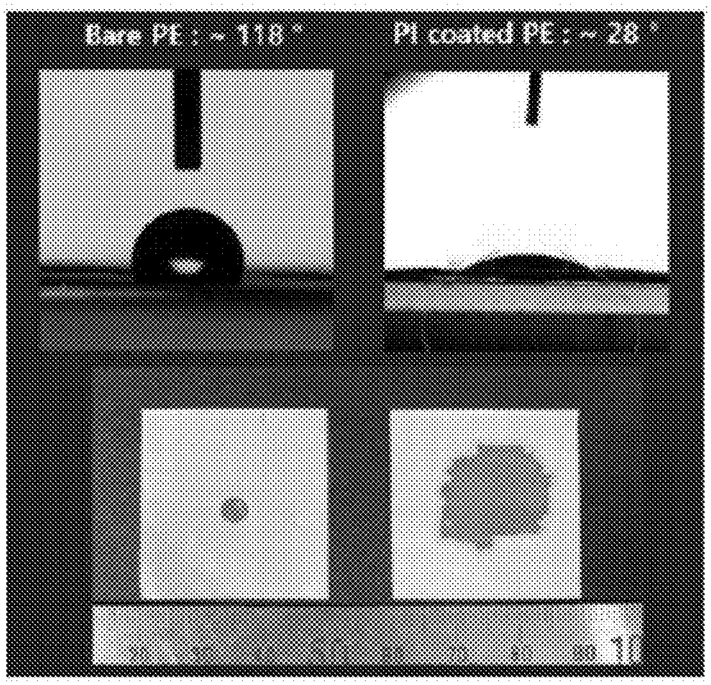
FIG. 2 is a view illustrating a result of comparing the contact angle on the composite separator according to Example of the present invention with that on a bare polyethylene membrane.

The contact angles on the polyimide-powder composite separator manufactured according to the method of Example 1 and a bare polyethylene membrane were analyzed. The contact angle was measured by dropping DI water using the Contact Angel System OCA, and the measurement results are as illustrated in FIG. 2.

As a result of the measurement, it has been confirmed that the contact angle on the polyimide-powder composite separator is significantly decreased to 28° compared to that on the bare polyethylene membrane.

<Experimental Example 1-2> Analysis of Thermal Shrinkage

Figure 3:
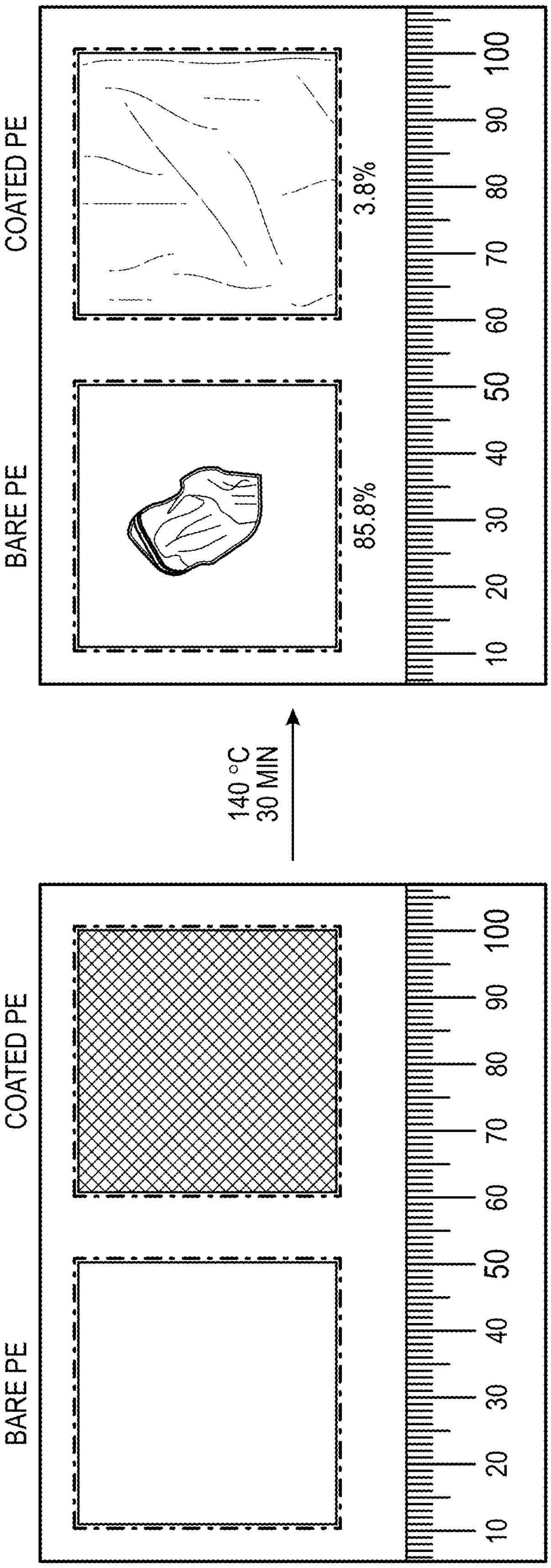
FIG. 3 is a view illustrating a result of comparing the thermal shrinkage of the composite separator according to Example of the present invention with that of a bare polyethylene membrane.
Figure 4:
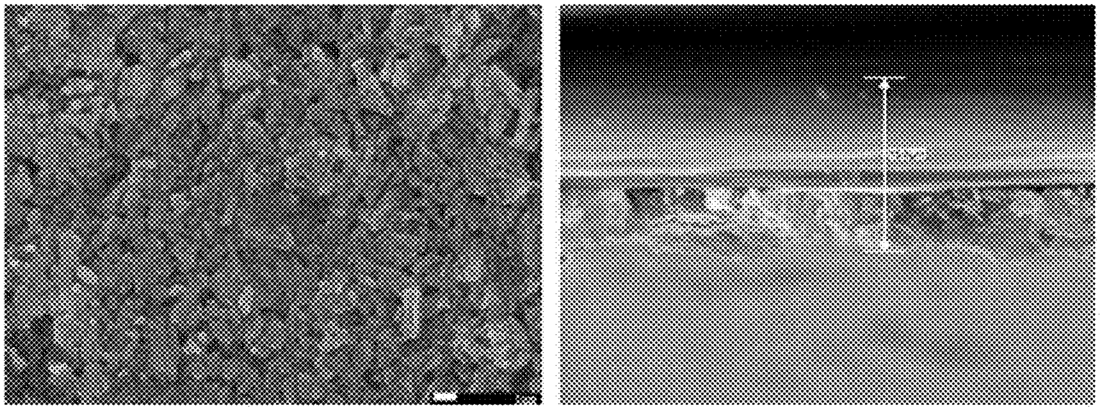
FIG. 4 is a view illustrating a result of SEM measurement of the cross-section of the composite separator according to Example of the present invention.

The thermal shrinkages of the polyimide-powder composite separator manufactured according to the method of Example 1 and a bare polyethylene membrane were analyzed. The thermal shrinkage was measured based on the horizontal/vertical values before and after heat treatment of the membrane sample at 140° C. for 30 minutes in an oven, and the measurement results are as illustrated in FIG. 3.

As a result of the measurement, the thermal shrinkage of the polyimide-powder composite separator is only 3.8% while that of the bare polyethylene membrane is 85.8%, and it has been confirmed that heat resistance of the polyimide-powder composite separator is excellent.

<Experimental Example 1-3> Analysis of Electrolyte Absorption

Figure 5:
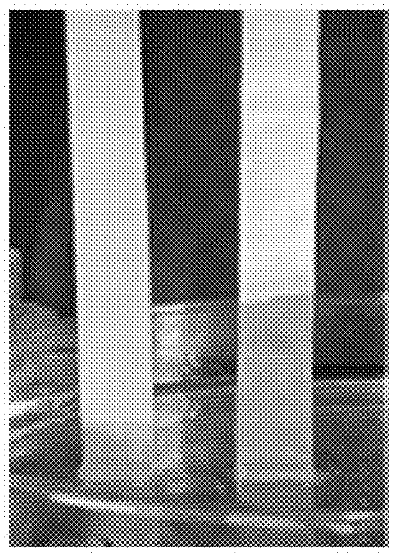
FIG. 5 is a view illustrating a result of comparing the electrolyte absorbing power of the composite separator according to Example of the present invention with that of a bare polyethylene membrane.

The electrolyte absorptions of the polyimide-powder composite separator manufactured according to the method of Example 1 and a bare polyethylene membrane were analyzed using a 1 mol concentration lithium hexafluorophosphate in EC/DMC/DEC=1:1:1 (v/v/v) electrolyte solution. After each separator prepared in the size of 1×12 $cm^2$ was placed in a Petri dish containing the electrolyte solution, the degree of absorption for 1 hour was analyzed. The measurement results are as illustrated in FIG. 5.

As a result of the measurement, the electrolyte absorption of the polyimide-powder composite separator is 4.2 cm and that of the bare polyethylene membrane is 0.9 cm, and it has been confirmed that the electrolyte absorption of the polyimide-powder composite separator is as excellent as about four times.

The present invention is environmentally friendly since polyimide is prepared using water as a solvent and an organic solvent is not used in the overall process of manufacturing a composite separator, and has advantageous effects in terms of time, cost, and manufacturing process since a high temperature/high pressure environment is not required.

While the present invention has been described with respect to the specific embodiments, it will be apparent to those skilled in the art that various changes and modifications may be made without departing from the spirit and scope of the invention as defined in the following claims.

What is claimed is:

1. A method for manufacturing a composite separator, the method comprising:

(a) preparing a polyimide-powder by reacting a dianhydride with a diamine in water and further adding a compound represented by the following Chemical Formula 3:

$NH_2—R_3—Si(R_4)_3$ [Chem. 3]

wherein $R_3$ is substituted or unsubstituted $C_{1-10}$ alkylene or substituted or unsubstituted $C_{1-10}$ heteroalkylene, wherein one or more hydrogen atoms are substituted with =O, —OH, $C_{1-3}$ alkyl or $NH_2$ when substituted, and wherein each $R_4$ is independently $C_{1-3}$ alkoxy;

(b) preparing a polyimide-binder solution by mixing the polyimide-powder prepared in step (a) with a binder; and (c) preparing a composite separator by coating a separator with the polyimide-binder solution prepared in step (b).

2. The method for manufacturing a composite separator according to claim 1, wherein the dianhydride in step (a) is represented by the following Chemical Formula 1:

[Chem. 1]

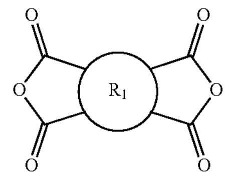

wherein $R_1$ in Chemical Formula 1 is selected from the group consisting of the following chemical structures:

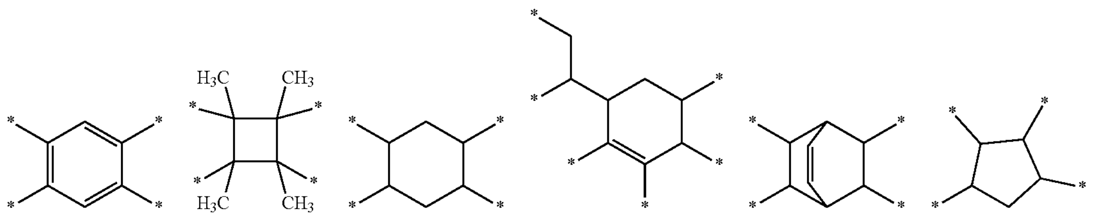

-continued
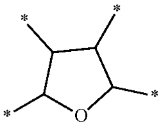
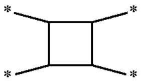
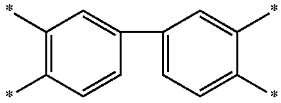
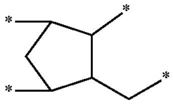
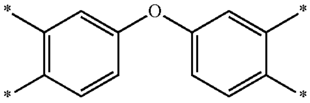
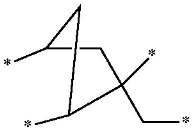
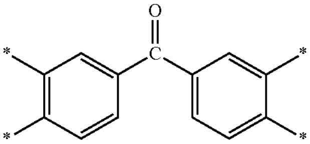
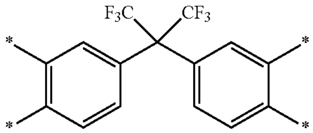
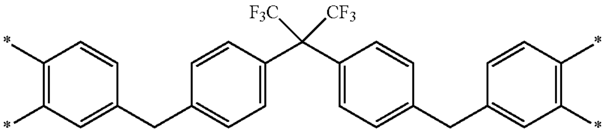
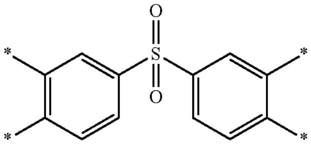
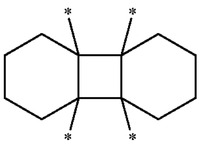
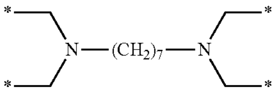
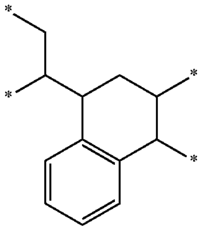
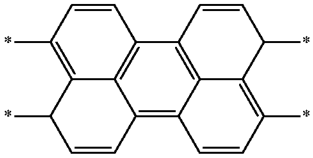
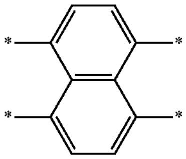
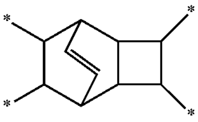
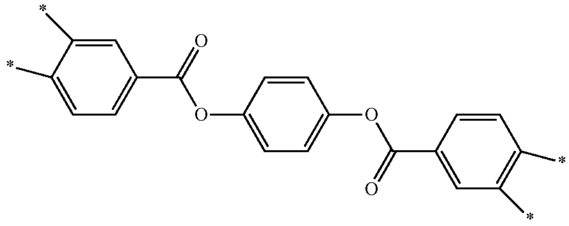
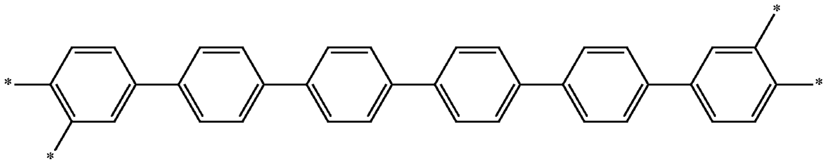
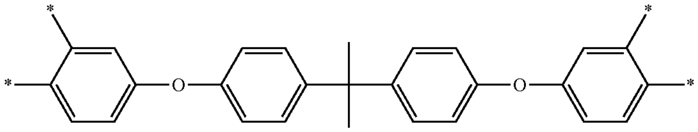
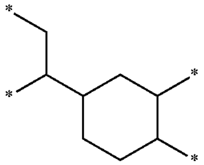
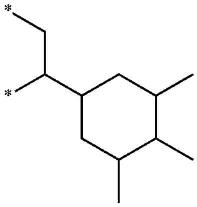
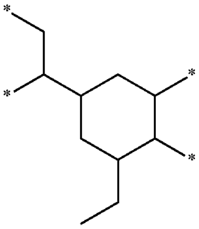
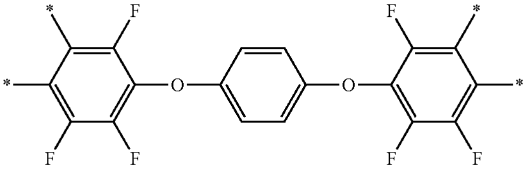
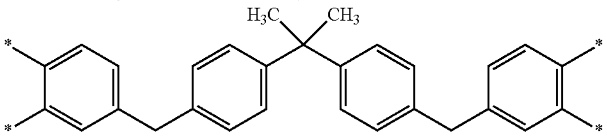
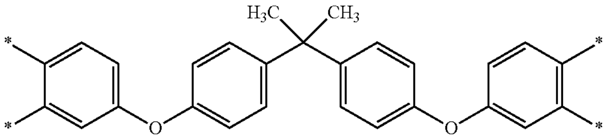
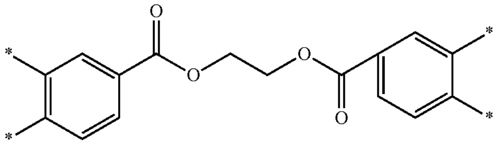

-continued
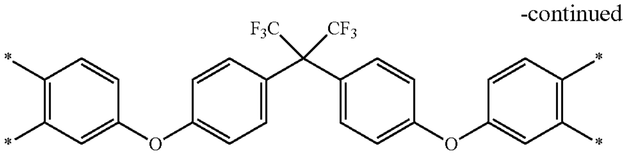
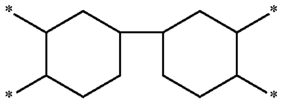
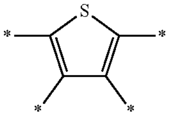
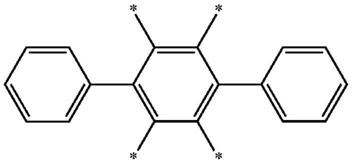
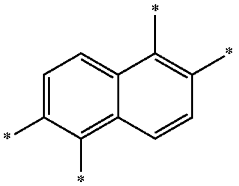
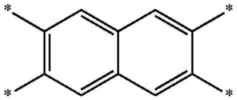
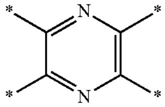
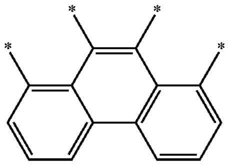
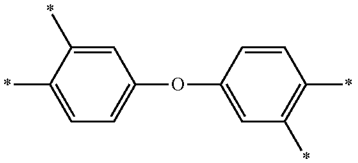
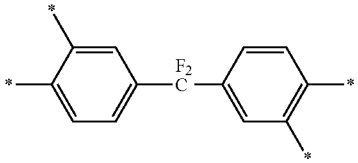
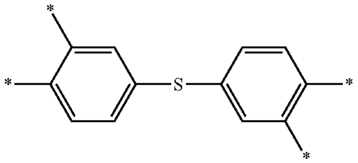
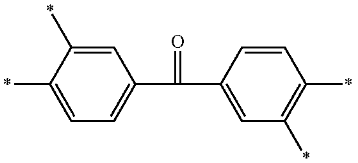
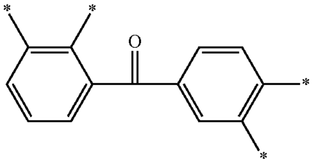
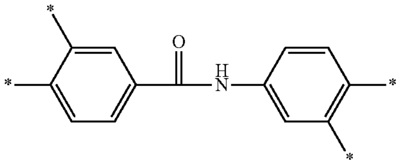
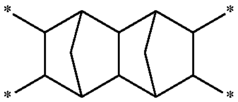
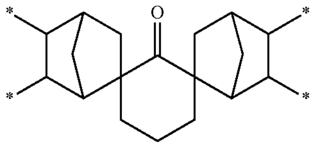
and
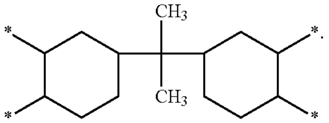
3. The method for manufacturing a composite separator according to claim 1,
wherein the diamine in step (a) is represented by the following Chemical Formula 2:
[Chem. 2]
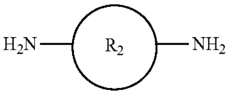
wherein $R_2$ in Chemical Formula 2 is selected from the group consisting of the following chemical structures:
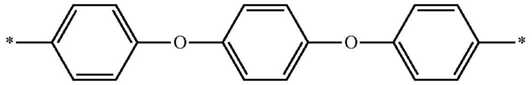
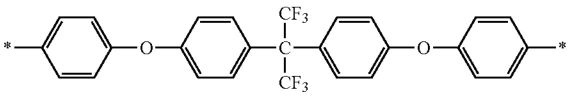
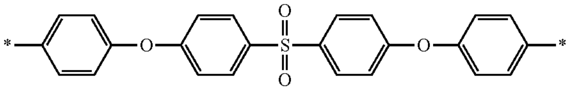
-continued
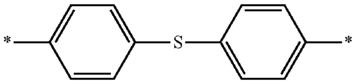
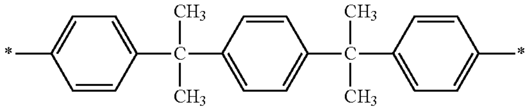
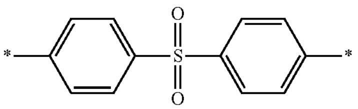
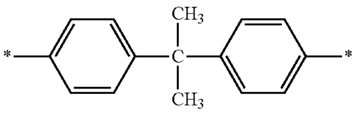
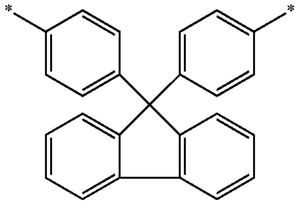
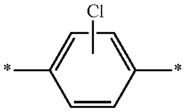

-continued
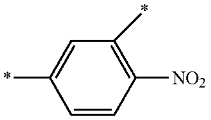
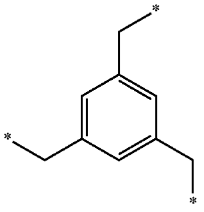
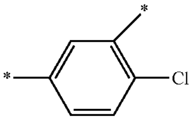
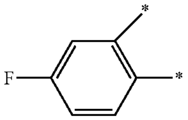
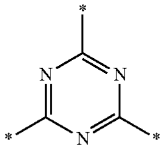
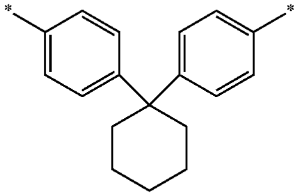
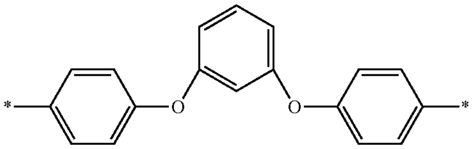
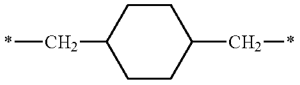
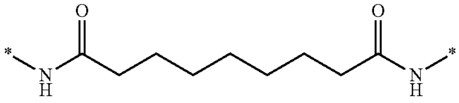
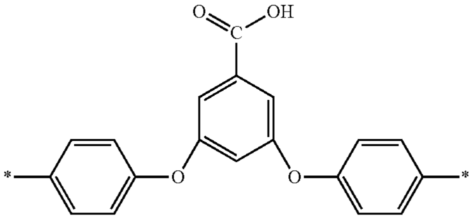
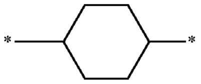
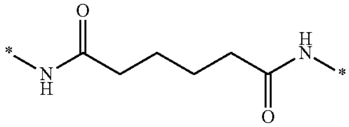
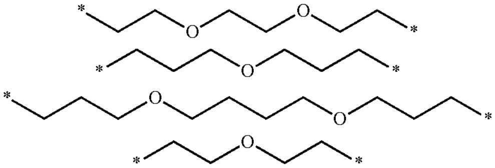
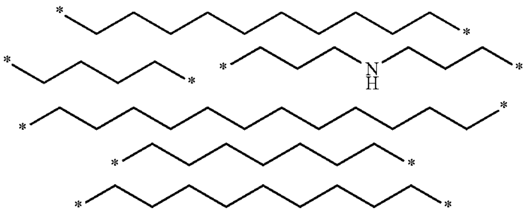
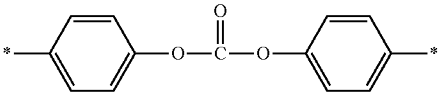
-continued
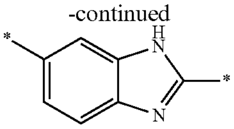
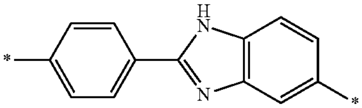
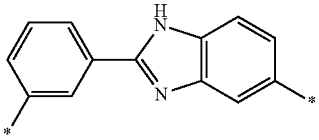
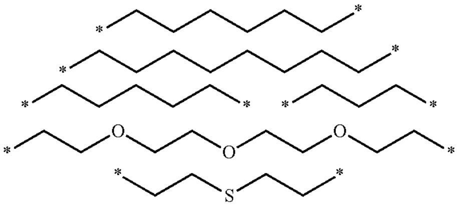
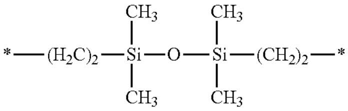
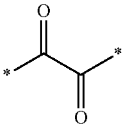
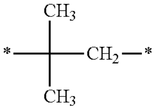
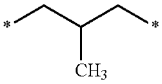
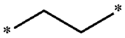
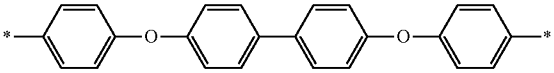
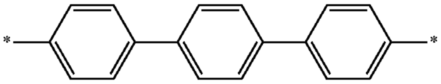
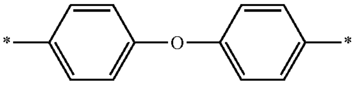
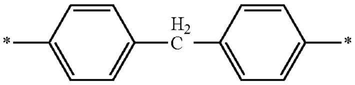
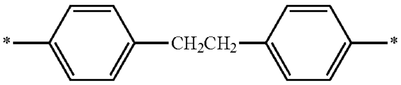
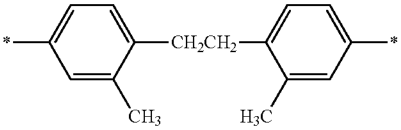
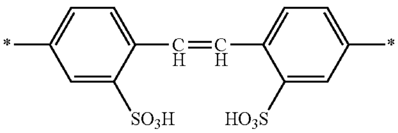
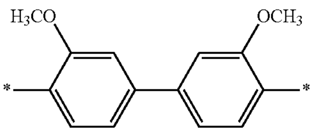
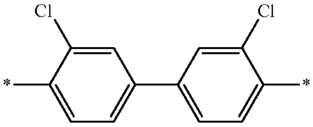

-continued
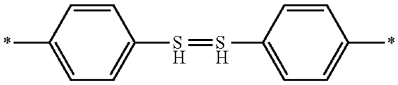
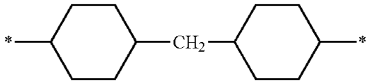
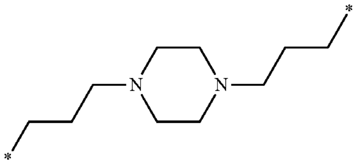
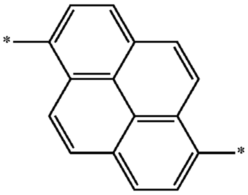
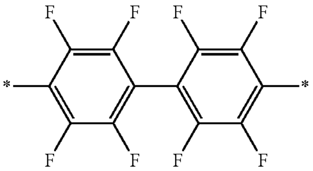
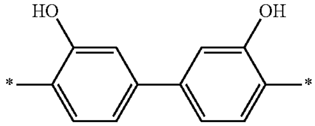
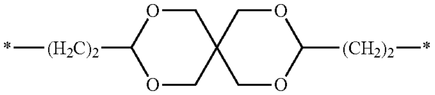
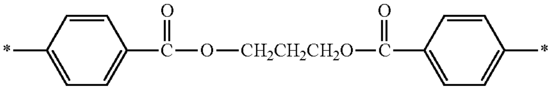
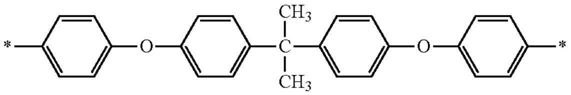
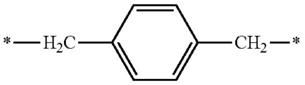
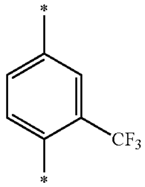
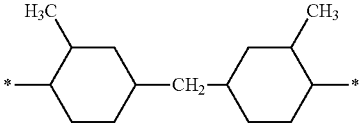
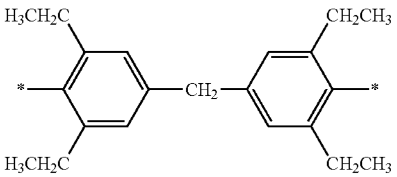
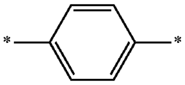
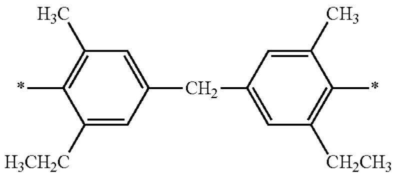
-continued
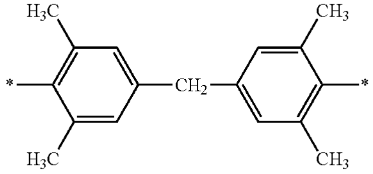
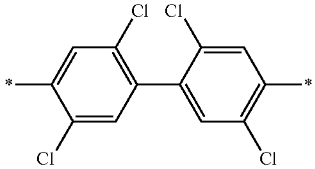
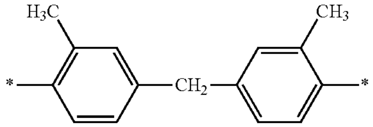
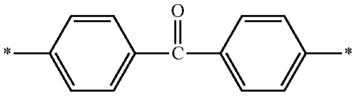
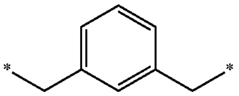
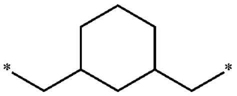
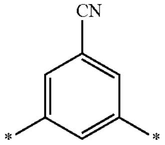
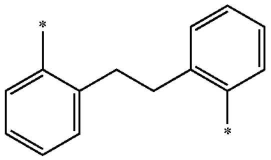
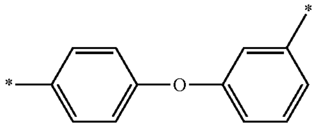
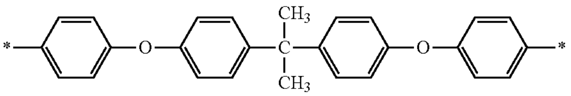
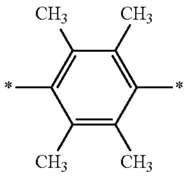
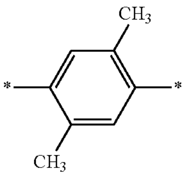
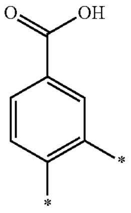
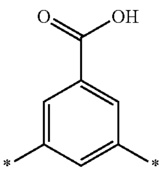
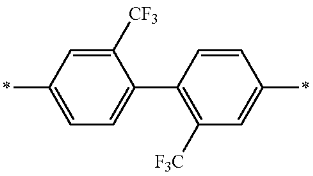
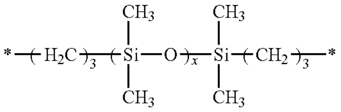
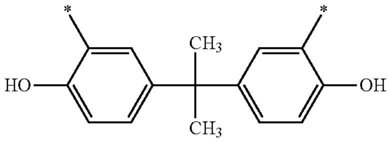

-continued
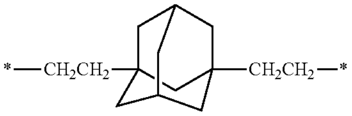
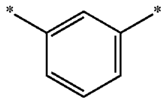
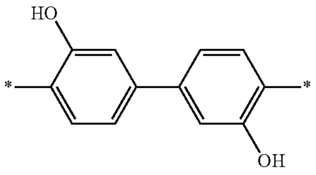
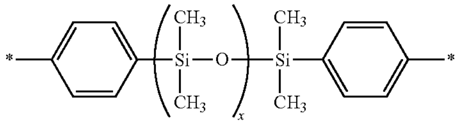
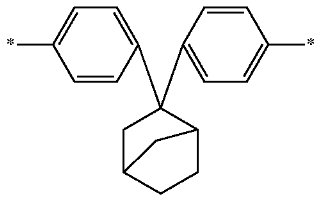
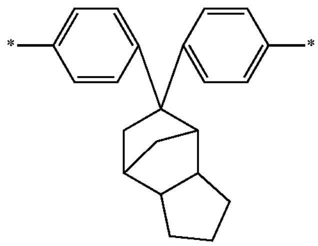
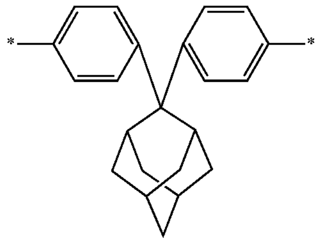
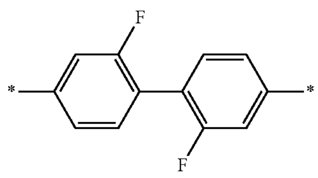
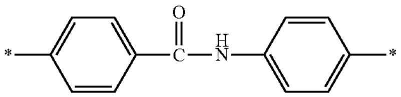
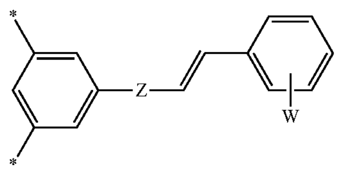
-continued
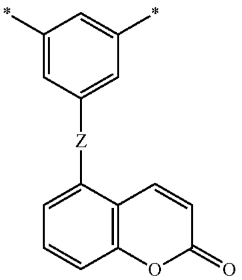
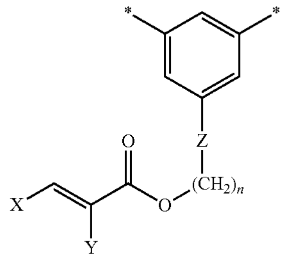
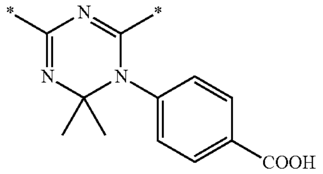
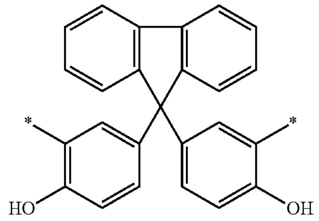
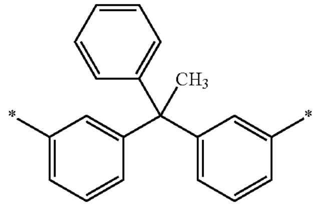
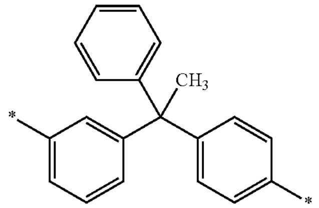
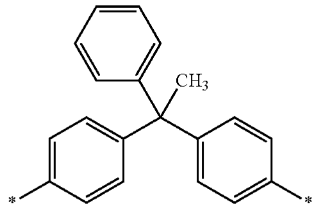
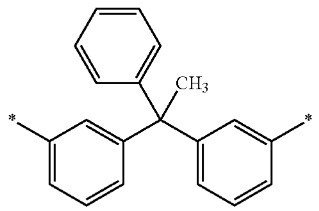
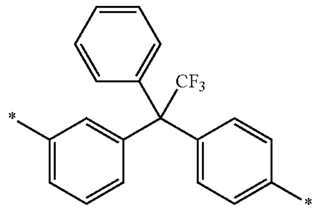

-continued

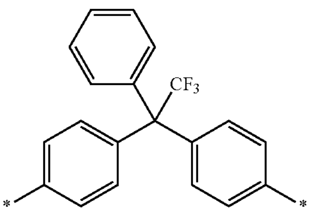

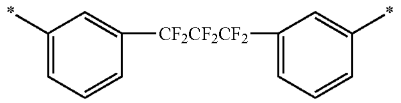

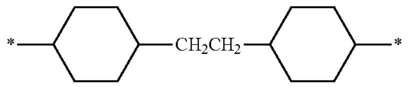

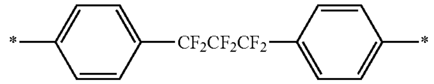

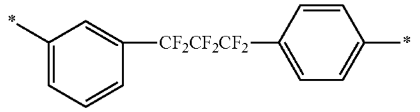

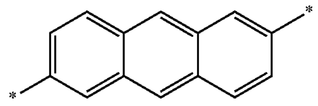

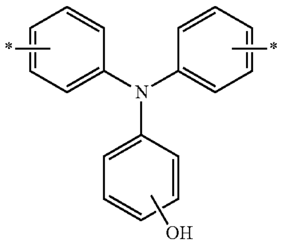

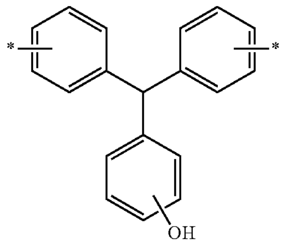

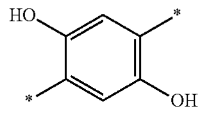

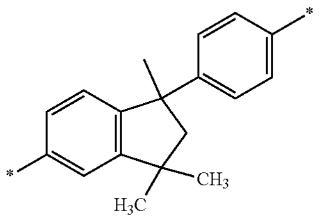

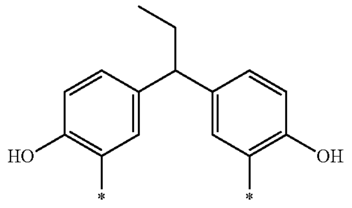

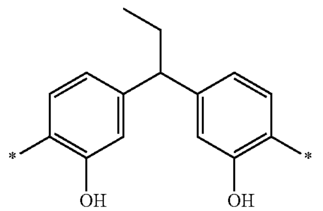

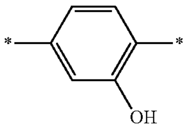

-continued

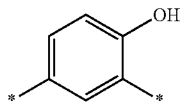

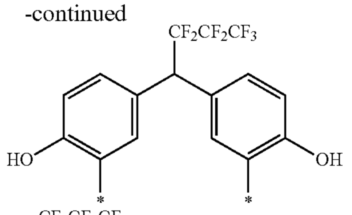

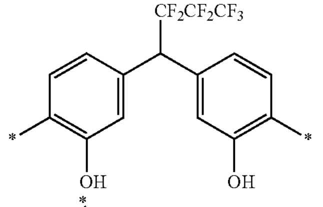

and

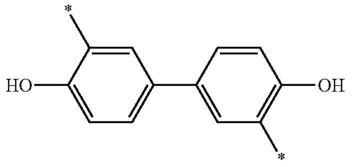

wherein:

x is an integer satisfying 1≤≤50, n is a natural number in a range of 1 to 20,

W, X, and Y are each an alkyl group having 1 to 30 carbon atoms or an aryl group, and Z is selected from the group consisting of an ester group, an amide group, an imide group, and an ether group.

4. The method for manufacturing a composite separator according to claim 1, wherein the reaction in step (a) is conducted by further adding a catalyst and a dehydrating agent.

5. The method for manufacturing a composite separator according to claim 1, wherein the reaction in step (a) is conducted at 10° C. to 100° C.

6. The method for manufacturing a composite separator according to claim 1, wherein the reaction in step (a) is conducted for 15 to 35 hours.

7. The method for manufacturing a composite separator according to claim 4, wherein the catalyst is one or more selected from the group consisting of pyridine, imidazole, quinoline, isoquinoline, trimethylamine, triethylamine, tripropylamine, tributylamine, dimethylpyridine, and methylethylpyridine.

8. The method for manufacturing a composite separator according to claim 4, wherein the dehydrating agent is one or more selected from the group consisting of acetic anhydride, propionic anhydride, butyric anhydride, formic anhydride and aromatic monocarboxylic anhydride.

9. The method for manufacturing a composite separator according to claim 1, wherein the polyimide-binder solution is prepared using water as a solvent in step (b).

10. The method for manufacturing a composite separator according to claim 1, wherein the polyimide-powder is 1 to 10 wt % with respect to the polyimide-binder solution in step (b).

11. The method for manufacturing a composite separator according to claim 1, wherein the binder is 0.01 to 0.5 wt % with respect to the polyimide-binder solution in step (b).

12. The method for manufacturing a composite separator according to claim 1, wherein the binder in step (b) is one or more selected from the group consisting of carboxymethyl cellulose, carboxymethyl cellulose salt, cellulose, hydroxypropyl cellulose, hydroxypropyl methylcellulose, hydroxyethyl methyl cellulose, polyvinyl alcohol, polyacrylamide, polyacrylic acid, polyvinyl pyrrolidone, pullulan, polyethylene glycol, divinyl ether-maleic anhydride (DIVEMA), polyoxazoline, polyphosphate, and polyphosphazene.

13. The method for manufacturing a composite separator according to claim 1, wherein the separator in step (c) is formed of polyethylene, polypropylene, or a combination thereof.

14. The method for manufacturing a composite separator according to claim 1, wherein the composite separator is a separator for a lithium-ion secondary battery.

15. A composite separator manufactured by the manufacturing method according to claim 1.

16. The composite separator according to claim 15, wherein the composite separator has a contact angle of 35° or less.

17. The composite separator according to claim 15, wherein the composite separator has a thermal shrinkage of 10% or less.

* * * * *